COLOUR-TELEVISION TRANSMISSION SYSTEMS

Filed May 18, 1953

INVENTORS
Johan Haantjes
Frederik Willem de Vrijer
BY Fred M Vogel
Agent

United States Patent Office 2,828,354

Patented Mar. 25, 1958

2,828,354

COLOUR-TELEVISION TRANSMISSION SYSTEMS

Johan Haantjes and Frederik Willem de Vrijer, Eindhoven, Netherlands, assignors, by mesne assignments, to North American Philips Company, Inc., New York, N. Y., a corporation of Delaware Application May 18, 1953, Serial No. 355,729

Claims priority, application Netherlands May 27, 1952

6 Claims. (Cl. 178—5.2)

This invention relates to multiplex transmission systems for the transmission of television images, for example, colour-television images or similar images which are scanned line by line, in which neither a colour switch operating at line-, frame- or field frequency nor an auxiliary carrier or punctuating signal of suitable shape, frequency and phase is required at the receiving end for separating the signals utilised for the transmission.

In multiplex transmission systems for three television signals the main signal, for example, the brightness signal in most cases occupies the larger portion of the video-frequency bandwidth available. The first additional signal, for example, a colour signal, is modulated on an auxiliary carrier having one or two complete or partial side-bands and is located wholly outside the frequency range of the main signal. The second additional signal, likewise a colour signal, is modulated on an auxiliary carrier having one or two complete or partial side-bands, is located wholly or in part in the frequency range required for the first additional signal, but is also located wholly outside the frequency range of the main signal. The distance between the frequencies of the two auxiliary carriers must then preferably be an odd multiple of half the line-frequency since, as is well-known, not all frequencies are equally used for a television signal. In fact, an analysis of the video signal such as obtained by line by line scanning of the image shows that the energy of the signal largely concentrates at frequencies located in the vicinity of the harmonics of the line frequency.

If, now, the frequency of one auxiliary carrier is located between two frequencies which are equal to the sum or the difference of the frequency of the other auxiliary carrier and a harmonic of the line frequency and equal to the sum or the difference of the frequency of the other auxiliary carrier and a subsequent harmonic of the line frequency, respectively, the frequency ranges most occupied of one modulated auxiliary carrier exactly fall within the ranges least occupied of the other modulated auxiliary carrier. The interference brought about by one modulated auxiliary carrier in reproducing the signal modulated on the other auxiliary carrier will, in subsequent images, be of opposite polarity if the line frame is built up from an odd number of lines.

Said interference is thus neutralised in the image produced by the signal modulated on the other auxiliary carrier. Strictly speaking, such is the case only if a stationary image is transmitted, but if the field frequency is not unduly low, this also holds good approximately for moving objects, since as a result of the inertia of the eye, which adjusts itself to mean values in time, the influence of the interference is substantially neutralised visually.

Without further expedients, the main signal cannot extend in frequency further than to the lowest frequency of the frequency range occupied by the two signals modulated on auxiliary carriers.

Nevertheless, in order to be able to observe as much detail as possible in the image ultimately produced, the frequency band available for the main signal will be desired with maximum width.

The system according to the invention fulfils this desire and exhibits the characteristic that the auxiliary carriers have frequencies which are $$n+\frac{k}{4}$$

times and $$m+\frac{k+2}{4}$$

times the line scanning frequency, $n$ and $m$ being whole numbers, and that $k=1$, if the main signal coincides with the frequency range of the two additional signals and $k=2$, if the main signal coincides with the frequency range of one additional signal.

The system according to the invention and the transmitter and the receiver for this system will now be explained more fully with reference to one embodiment shown, by way of example, in the accompanying drawing.

Fig. 1 shows the frequency spectrum of three television signals in a transmission frequency-band extending from frequency $f_1$ to frequency $f_2$.

Figure 1:
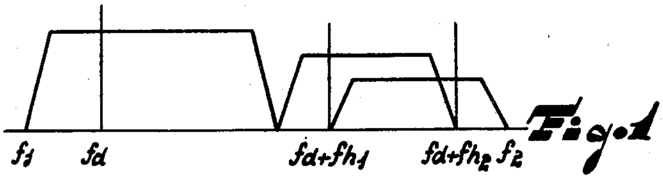
Fig. 1 shows the frequency spectrum of three television signals in the transmission path.
Figure 2:
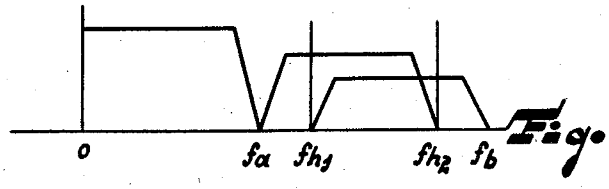
Fig. 2 shows the frequency spectrum of the said three television signals at the transmitting end.

Such a frequency spectrum is produced upon modulation of a carrier $f_d$ by three signals extending through frequency bands from 0 to $f_a$, from $f_a$ to $f_{h2}$, and from $f_{h1}$ to $f_b$, as shown in Fig. 2, and partial suppression of the lower sideband.

The main signal extends to the frequency $f_a$, the second signal between the frequencies $f_a$ and $f_{h2}$ being produced by modulation of a second video signal on an auxiliary carrier of frequency $f_{h1}$ having a lower side-band extending to $f_a$ and an upper side-band extending to $f_{h2}$, and the third signal between the frequencies $f_{h1}$ and $f_b$ being produced by modulation of a third video signal on an auxiliary carrier of frequency $f_{h2}$ having a lower side-band extending to $f_{h1}$ and an upper side-band extending to $f_b$. The distance between the frequencies of the two auxiliary carriers is an odd multiple of half the line frequencies, with the result that interference produced by the third video signal in the image of the second video signal, and conversely, is substantially neutralised visually.

If the main signal is to contain more informative value, it is required to extend farther than the frequency $f_a$, but in this case the frequency range occupied by the main signal and the frequency ranges occupied by the two other signals will overlap.

Figure 3:
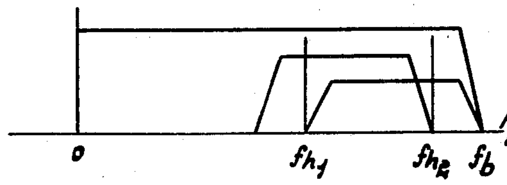
Fig. 3 shows the frequency spectrum of three television signals at the transmitting end according to the system of the invention.

Fig. 3 shows the frequency spectrum of the signal to be transmitted, if the main signal extends through the whole frequency-band available and hence from a frequency 0 to $f_b$.

The two other video signals are modulated, as before, on two auxiliary carriers, of which the frequency distance is an odd multiple of half the line frequency.

In order to ensure that the energy concentrations of the three signals have a minimum interfering action upon one another, the frequency of one auxiliary carrier is chosen to be $n+\frac{1}{4}$ times the line frequency and that of the other auxiliary carrier is chosen to be $m+\frac{3}{4}$ times the line frequency, $n$ and $m$ being whole numbers.

The signal as shown in Fig. 3 is obtained again in the receiver, if desired after modulation on a carrier $f_d$ at the transmitting end and demodulation at the receiving end.

In the said case in which the main signal extends to the frequency $f_b$, this signal may be supplied, for example, in full, to a control electrode of a picture tube and also to two selective demodulating devices, which are tuned to the frequencies $f_{h1}$ and $f_{h2}$, respectively.

The output signals of the said demodulating devices may be supplied to the control electrodes of two further picture tubes.

Each picture tube then reproduces, in addition to the signal desired thereon, interference originating from the two other signals. Thus, interference originating from the two additional signals appears on the picture tube for the main signal. However, by a suitable choice of the frequency of the auxiliary carriers, said interference is shifted in phase by 90° relatively to the interference in the preceding picture and hence neutralised after four pictures, if the line frame, as is common practice, is built up from an odd number of lines.

The neutralisation is complete only, if a stationary image is transmitted, but it is approximately also the case with moving objects if the field frequency is not unduly low.

Interference originating from the other additional signal and from the main signal appears on a picture tube for an additional signal. The interferences produced by the other additional signal are relatively shifted in phase by 180° in two successive images, since the difference between the frequencies of the two auxiliary carriers is an odd multiple of half the line frequency. Said interference is thus neutralised after two images.

The interferences brought about by the main signal in two successive images are relatively shifted in phase by 90° and hence are neutralised after four images.

Figure 4:
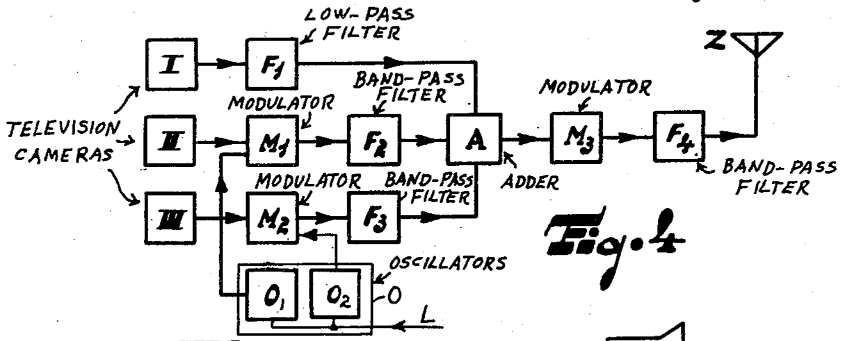
Fig. 4 is a diagrammatic view of one embodiment of a transmitter for a system according to the invention.

Fig. 4 shows in block diagram a simplified embodiment of a transmitter for the multiplex transmission system according to the invention. The devices I, II and III represent television cameras which provide the main signal and the two colour signals, respectively. Suitable cameras, as known to the prior art, are as follows: Camera I may have an optical filter positioned in the optical path thereof and adapted to pass all of the green colour components of a scene and selected amounts of red and blue colour components. Thus, the output signal of camera I not only represents the green colour component of the scene being viewed, but also is an indication of the overall brightness of the scene because it is a composite of all colors. Hence, this is called the main signal. Camera II may have an optical filter positioned in the optical path thereof and adapted to pass only the red colour component of the scene, and camera III may have an optical filter positioned in the optical path thereof and adapted to pass only the blue colour component of the scene, so that the output signals of cameras II and III represent the individual colours red and blue, respectively.

The main signal originating from I is led to a low-pass filter $F_1$ having a cut-off frequency $f_b$.

The output signal of II is supplied to a modulator $M_1$, in which it is modulated on an auxiliary carrier having a frequency $f_{h1}$, which is $n+\frac{1}{4}$ times the line frequency. This carrier wave is derived from a device O, which comprises an oscillator $O_1$ suitable for the purpose, which is controlled by means of the line-synchronisation pulses incoming at L. These line-synchronizing pulses are the same synchronizing pulses which are normally employed for synchronizing the line-by-line scanning of the television picture. The auxiliary carrier thus modulated by the output signal of II is supplied to a band-pass filter $F_2$, of which the upper cut-off frequency is at the most equal to a frequency $f_{h2}$ and the lower cut-off frequency is lower than the frequency $f_{h1}$. The output signal of III is supplied to a modulator $M_2$, in which it is modulated on an auxiliary carrier of the frequency $f_{h2}$, which is $n+\frac{3}{4}$ times the line frequency. This auxiliary carrier is derived from an oscillator $O_2$ in the device O, which is controlled by the said pulses incoming at L.

The output signal of modulator $M_2$ is supplied to a band-pass filter $F_3$, of which the lower cut-off frequency is at least equal to the frequency $f_{h1}$ and the upper cut-off frequency is higher than the frequency $f_{h2}$.

The output signals of the three filters $F_1$, $F_2$ and $F_3$ are additively combined in an adding device A.

The output signal of A may be either transmitted through a line or, as shown in Fig. 4, be supplied to a transmitting aerial Z after being modulated on a high-frequency carrier in a modulator $M_3$ and limited in band-width in a band-pass filter $F_4$.

It is evident that $f_{h1}$ may be chosen to be $(n+\frac{3}{4})$ instead of $(n+\frac{1}{4})$ times the line frequency. However, in this case, the frequency $f_{h2}$ must be $(m+\frac{1}{4})$ times the line frequency.

Figure 5:
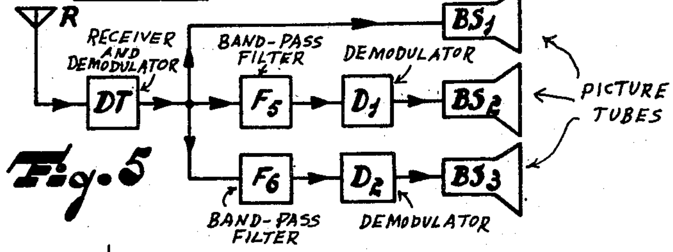
Fig. 5 is a diagrammatic view of one embodiment of a receiver co-operating with the transmitter shown in Fig. 4.

Fig. 5 shows in block diagram a simplified embodiment of a receiver for the multiplex transmission system according to the invention, adapted for the reception of signals emitted by the transmitter shown in Fig. 4.

The signal received by a receiving aerial R is supplied to a demodulating stage DT, at the output of which a signal occurs as shown in Fig. 3. This output signal is supplied, on the one hand, to a picture tube $BS_1$ and, on the other, to two band-pass filters $F_5$ and $F_6$, of which $F_5$ has a transmission range comprised between $f_{h2}$ and a frequency lower than $f_{h1}$, and $F_6$ has a transmission range comprised between $f_{h1}$ and a frequency higher than $f_{h2}$.

The output signal of $F_5$ is supplied to a demodulator $D_1$ which, together with filter $F_5$, constitutes a demodulating circuit which is tuned to the carrier wave $f_{h1}$, and which supplies the signal modulated on $f_{h1}$ plus the interference originating from the two other signals to a picture tube $BS_2$, in which said interference is substantially neutralised visually by the said choice of the auxiliary-carrier frequencies.

The output signal of $F_6$ is supplied to a demodulator $D_2$ which, together with filter $F_6$, constitutes a demodulating circuit which is tuned to the carrier wave $f_{h2}$, and which supplies the signal modulated on $f_{h2}$ plus the interference originating from the two other signals to a picture tube $BS_3$.

The images of the three picture tubes $BS_1$, $BS_2$, $BS_3$ may finally be united by optical means. A further possibility is to supply the output signals of DT, $D_1$ and $D_2$ to the control electrodes of a three-colour tube.

A signal emitted by a transmitter as described with reference to Fig. 4 may readily be received by an ordinary black-white television receiver, provided of course that the line- and video frequencies, etc. for transmitter and receiver are equal. On the picture tube of the receiver concerned a signal will appear similar to that which appears on the picture tube $BS_1$ of the receiver shown in Fig. 5, viz. the main signal plus the interference from the two additional signals. Said interference will, as before, be neutralised in four picture periods, the main signal containing sufficient information to produce a very satisfactory image.

The receiver described with reference to Fig. 5 is adapted for the reception of signals emitted by an ordinary black-white television transmitter. The output signal of demodulating stage DT is supplied, for example, to all three picture tubes, or in the case of a three-colour tube, to all three control electrodes of the tube.

Suitable modulators, filters, oscillators, demodulators, and additive circuits, used in the preferred form of practicing the invention, are well known to those skilled in the art and therefore have not been explained in detail.

Figure 6:
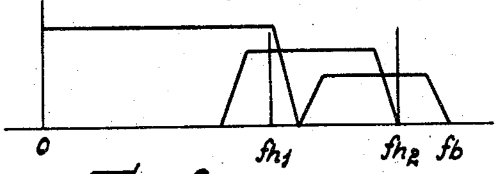
Fig. 6 shows the frequency spectrum of three television signals at the transmitting end, likewise for a system according to the invention.

If the main signal need not necessarily extend to the frequency $f_b$, the frequency range of the main signal may partly coincide with the frequency range of only one additional signal. Such a frequency spectrum is shown in Fig. 6.

Only the additional signal which is constituted by the auxiliary carrier of the frequency $f_{h1}$ and its side-bands brings about interference in the main signal, so that the frequency $f_{h1}$ may be chosen to be an odd multiple of half the line frequency.

Since the frequency difference between the two auxiliary carriers of the frequencies $f_{h1}$ and $f_{h2}$ is also an odd multiple of half the line frequency, the frequency $f_{h2}$ is a multiple of the line frequency.

What is claimed is:

1. A multiplex transmission system for the transmission and reception of television pictures which are line-scanned and which are represented by three component video signals, comprising transmitting apparatus including means for producing a main signal which is a composite of said three component video signals, said main signal having a predetermined frequency band, means for producing two of said component video signals individually, means for producing two auxiliary carrier waves, means for modulating said two auxiliary carrier waves with said two component video signals, respectively, to provide two modulated signals, the frequency distance between the auxiliary carrier waves being an odd multiple of half the line scanning frequency and the frequency range of one of said modulated signals coinciding at least in part with the frequency range of the other of said modulated signals, one of said auxiliary carrier waves having a frequency which is $$n+\frac{k}{4}$$

times the line scanning frequency and the other of said auxiliary carrier waves having a frequency which is $$m+\frac{k+2}{4}$$

times the line scanning frequency, where $n$ and $m$ are whole numbers and where $k$ is an integer which lies in the range defined by 1 and 2, and receiving apparatus for said main signal and said two modulated signals, said receiving apparatus including a first selective demodulator tuned to the frequency of one of said auxiliary carrier waves and a second selective demodulator tuned to the frequency of the other of said auxiliary carrier waves.

2. A transmitter in a multiplex system for the transmission of television pictures which are line-scanned and which are represented by three component video signals, comprising transmitting apparatus including means for producing a main signal which is a composite of said three component video signals, said main signal having a predetermined frequency band, means for producing two of said component video signals individually, means for producing two auxiliary carrier waves, means for modulating said two auxiliary carrier waves with said two component video signals, respectively, to provide two modulated signals, the frequency distance between the auxiliary carrier waves being an odd multiple of half the line scanning frequency and the frequency range of one of said modulated signals coinciding at least in part with the frequency range of the other of said modulated signals, one of said auxiliary carrier waves having a frequency which is $$n+\frac{k}{4}$$

times the line scanning frequency and the other of said auxiliary carrier waves having a frequency which is $$m+\frac{k+2}{4}$$

times the line scanning frequency, where $n$ and $m$ are whole numbers and where $k$ is an integer which lies in the range defined by 1 and 2.

3. In a multiplex transmission system for the transmission and reception of television pictures which are line-scanned and which are represented by three component video signals, comprising transmitting apparatus including means for producing a main signal which is a composite of said three component video signals, said main signal having a predetermined frequency band, means for producing two of said component video signals individually, means for producing two auxiliary carrier waves, means for modulating said two auxiliary carrier waves with said two component video signals, respectively, to provide two modulated signals, the frequency distance between the auxiliary carrier waves being an odd multiple of half the line frequency and the frequency range of one of said modulated signals coinciding at least in part with the frequency range of the other of said modulated signals, one of said auxiliary carrier waves having a frequency which is $$n+\frac{k}{4}$$

times the line scanning frequency and the other of said auxiliary carrier waves having a frequency which is $$m+\frac{k+2}{4}$$

times the line scanning frequency, where $n$ and $m$ are whole numbers and where $k$ is an integer which lies in the range defined by 1 and 2; a multiplex receiver comprising means for intercepting and demodulating said main signal and said two modulated signals, a first selective demodulator coupled to said demodulating means and tuned to the frequency of one of said auxiliary carrier waves and a second selective demodulator coupled to said demodulating means and tuned to the frequency of the other of said auxiliary carrier waves.

4. A multiplex system for the transmission and reception of signals representing brightness and color information in color television pictures which are line-scanned and which are represented by three component video signals, comprising a first pick-up camera apparatus for producing a main signal which is a composite of said three component video signals and having a predetermined frequency band and representing picture brightness information, a first filter circuit coupled to the output of said first camera apparatus and having a cut-off frequency equal to said main signal frequency band, a means for individually producing one of said component video signals and comprising second pick-up camera apparatus for producing signals representing substantially only one color in said color television pictures, a first modulator coupled to said second apparatus, means for individually producing another of said component video signals and comprising a third pick-up camera apparatus for producing signals representing substantially only another color in said color television pictures, a second modulator coupled to said third apparatus, a pulse synchronised oscillatory circuit for supplying a first auxiliary carrier wave having a frequency which is $$n+\frac{k}{4}$$

times the line scanning frequency to said first modulator, pulse synchronized oscillatory circuit for supplying a second auxiliary carrier wave having a frequency which is $$m+\frac{k+2}{4}$$

times the line scanning frequency to said second modulator, $n$ and $m$ being whole numbers and $k$ being an integer which lies in the range defined by 1 and 2, the frequency distance between said auxiliary carrier waves being an odd multiple of half the line frequency, a first band-pass filter circuit coupled to the output of said first modulator and having an upper cut-off frequency which is less than the frequency of said second auxiliary carrier wave and a lower cut-off frequency which is less than the frequency of said first auxiliary carrier wave, a second band-pass filter circuit coupled to the output of said second modulator and having a lower cut-off frequency which exceeds the frequency of said first auxiliary carrier wave and an upper cut-off frequency which exceeds the frequency of said second auxiliary carrier wave, the lower cut-off frequency of said second band-pass filter circuit being lower than the upper cut-off frequency of said first band-pass filter circuit, an adder coupled to the output of each of said filters for additively combining the signals which pass through said filters, means for transmitting said combined signals, means for receiving said transmitted signals, a first television image reproducing device coupled to said receiving means, a third band-pass filter circuit coupled to the output of said receiving means and having upper and lower cut-off frequencies corresponding to the upper and lower cut-off frequencies, respectively, of said first band-pass filter circuit, a second television image reproducing device, a first detector interposed between said second device and said third band-pass filter circuit, a fourth band-pass filter circuit coupled to the output of said receiving means and having upper and lower cut-off frequencies corresponding to the upper and lower frequencies, respectively, of said second band-pass filter circuit, a third television image reproducing device, and a second detector interposed between said third device and said fourth band-pass filter circuit.

5. A transmitter in a multiplex system for the transmission of signals representing brightness and color information in color television pictures which are line-scanned and which are represented by three component video signals, comprising a first pick-up camera apparatus for producing a main signal which is a composite of said three component video signals and having a predetermined frequency band and representing picture brightness information, a first filter circuit coupled to the output of said first camera apparatus and having a cut-off frequency equal to said main signal frequency band, means for individually producing one of said component video signals and comprising a second pick-up camera apparatus for producing signals representing substantially only one color in said color television pictures, a first modulator coupled to said second apparatus, means for individually producing another of said component video signals and comprising a third pick-up camera apparatus for producing signals representing substantially only another color in said color television pictures, a second modulator coupled to said third apparatus, a pulse synchronised oscillatory circuit supplying a first auxiliary wave having a frequency which is $$n+\frac{k}{4}$$

times the line scanning frequency to said first modulator, a pulse synchronized oscillatory circuit supplying a second auxiliary carrier wave having a frequency which is $$m+\frac{k+2}{4}$$

times the line scanning frequency to said second modulator, $n$ and $m$ being whole numbers and $k$ being an integer which lies in the range defined by 1 and 2, the frequency distance between said auxiliary carrier waves being an odd multiple of half the line frequency, a first band-pass filter circuit coupled to the output of said first modulator and having an upper cut-off frequency which is less than the frequency of said second auxiliary carrier wave and a lower cut-off frequency which is less than the frequency of said auxiliary carrier wave, a second band-pass filter circuit coupled to the output of said second modulator and having a lower cut-off frequency which exceeds the frequency of said first auxiliary carrier wave and an upper cut-off frequency which exceeds the frequency of said second auxiliary carrier wave, the lower cut-off frequency of said second band-pass filter circuit being lower than the upper cut-off frequency of said first band-pass filter circuit, an adder coupled to the output of each of said filters for additively combining the signals which pass through said filters, and means for transmitting said combined signals.

6. In a multiplex system for the transmission and reception of signals representing brightness and color information in color television pictures which are line-scanned and which are represented by three component color signals and wherein there is produced a main signal which is a composite of said three component color signals and having a predetermined frequency band and representing picture brightness information and wherein there also are produced individually two of said component color signals which are respectively modulated on two auxiliary carrier waves to produce two modulated signals, the frequency distance between the auxiliary carrier waves being an odd multiple of half the line frequency and the frequency range of one of said modulated signals coinciding at least in part with the frequency range of the other of said modulated signals, one of said auxiliary carrier waves having a frequency which is $$n+\frac{k}{4}$$

times the line scanning frequency and the other of said auxiliary carrier waves having a frequency which is higher than that of said one carrier wave and which is $$m+\frac{k+2}{4}$$

times the line scanning frequency, where $n$ and $m$ are whole numbers and where $k$ is an integer which lies in the range defined by 1 and 2; a multiplex receiver comprising means for receiving said main and two modulated signals, a first television image reproducing device coupled to said receiving means, a first band-pass filter circuit coupled to said receiving means and having an upper cut-off frequency which is less than the frequency of said other auxiliary carrier wave and a lower cut-off frequency which is less than the frequency of said one auxiliary carrier wave, a second television image reproducing device, a first detector interposed between said second device and said first band-pass filter circuit, a second band-pass filter circuit coupled to said receiving means and having a lower cut-off frequency which exceeds the frequency of said one auxiliary carrier wave and an upper cut-off frequency which exceeds the frequency of said other auxiliary carrier wave, the lower cut-off frequency of said second band-pass filter circuit being lower than the upper cut-off frequency of said first band-pass filter circuit, a third television image reproducing device, and a second detector interposed between said third device and said second band-pass filter circuit.

No references cited.